UNITED STATES PATENT OFFICE.

HENRY SPENCER BLACKMORE, OF MOUNT VERNON, NEW YORK.

DISINFECTING OR ANTISEPTIC COMPOSITION AND PROCESS OF MAKING SAME.

No. 861,571. Specification of Letters Patent. Patented July 30, 1907.

Application filed February 11, 1905. Serial No. 245,252. (Specimens.)

*To all whom it may concern:*

Be it known that I, HENRY SPENCER BLACKMORE, a citizen of the United States, residing at Mount Vernon, in the county of Westchester and State of New York, have invented certain new and useful Improvements in a Disinfecting or Antiseptic Composition and Process of Making Same, of which the following is a specification.

This invention relates to a new article of manufacture or composition of matter for disinfecting, germicide, antiseptic, and medicinal purposes, and consists of a mixture, compound or solution of formic aldehyde, or its polymerids, in a volatile oxy-acid ester, such as methyl-acetic ester or compositions containing the same, which compounds or compositions may or may not be associated with other vehicles or masking agents, the object being to produce a solution of formic aldehyde or its polymerides which will be of permanent nature with reference to spontaneous decomposition and which may be utilized without producing disagreeable effects.

As a specific illustration of my new composition and the manner in which the same is made, I will take for example a solution of formic aldehyde in methyl acetic ester (methyl acetate). In producing this solution of formic aldehyde or its polymerids in methyl acetic ester I mix the solvent ester with an aqueous solution of formic aldehyde, say for instance a forty percent solution, in which the ester is partly soluble. I then thoroughly agitate the mixture and add thereto a supersaturated aqueous solution of some chemical compound, such as calcium chlorid or common salt, in which solution the formic aldehyde is practically insoluble. The presence of this foreign chemical solution displaces from the aqueous solution the formic aldehyde contained therein and also the ester employed as a solvent for the formic aldehyde, which formic aldehyde displaced from its aqueous solution readily assimulates with the methyl acetic ester and becomes permanently dissolved therein. This solution of formic aldehyde in methyl acetic ester separates from and floats upon the solution of chemical salts from which it may be separated by decantation, siphonic action, or other convenient means. By this operation it can be seen that the formic aldehyde is generated from its aqueous solution in the presence of the solvent ester by displacement from this aqueous solution.

I do not desire to confine myself to this specific method of generating formic aldehyde in the presence of volatile oxy-acid esters, but reserve the right to generate the formic aldehyde in any convenient manner, such as heating tri-oxy-methylene or paraformaldehyde to a point at which it breaks up into formic aldehyde while in the presence of a volatile oxy-acid ester, the product being collected by distillation and condensation and recovered as a formic aldehyde solution in the volatile ester distillate.

I have found it of advantage to employ compositions containing oxy-acid esters with formic aldehyde diluted with a vehicle, such as camphor oil, in which case it is found to act with satisfaction as an aerial disenfectant, inasmuch as the camphor oil and ester is volatile at ordinary atmospheric pressure and temperature and saturates the air coming in contact therewith with formic aldehyde and the ester, which, having a pleasant characteristic odor, perfumes the air and obviates the disagreeable pungent effect which usually accompanies the application of formic aldehyde *per se*.

I do not desire to confine myself to the empoylment of the aromatic oxy-acid esters as solvents, but may employ in combination with a solution of formic aldehyde in the ester a foreign substance capable of masking the odor of formic aldehyde, such as aromatic ketones; for example, the dissolving in a solution of formic aldehyde in methyl-acetic ester of a small quantity of ionone (synthetic violet), or digesting with the said solution of formic aldehyde in ester, of a substance containing an aromatic ketone, such as orris root, which combines the important and agreeable property of masking the pungent odor of formic aldehyde and producing a pleasant and agreeable perfuming composition without deteriorating or lessening the value of the formic aldehyde content, and which composition as a whole, is readily volatile at ordinary atmospheric pressure and temperature, imparting to the surrounding atmosphere to which exposed, a pleasant agreeable odor associated with the disinfectant, germicide, or antiseptic properties of the formic aldehyde.

An aromatic volatile solution of formic aldehyde thus produced may be readily employed in disinfecting rooms or apartments, by allowing the same to evaporate in a room or apartment or caused to be evaporated by agitating the same with a current of air, and may be dispensed readily in fragile tubes or receptacles containing a sufficient amount of formic aldehyde to thoroughly disinfect a given number of cubic feet of air and can be readily applied by breaking one of the fragile containers within a room of sufficient capacity, closing the same and allowing the volatile formic aldehyde solution to thoroughly saturate the atmosphere and permeate the contents of the room, with the additional advantage of not only thoroughly disinfecting the same, but with the additional and important feature that it will not destroy, deteriorate, or injure in any manner the most delicate fabrics, books, paintings, or other material with which the solution may come in contact.

It may be noted that formic aldehyde, which is a gas, unites or combines more readily with oxy-acids esters and becomes more readily assimilated, retained, or occluded therein in a more permanent manner and in a larger percentage without danger of polymerization than is the case with aqueous solutions, with the additional feature that they are volatile under ordinary atmospheric conditions, discharging the formic aldehyde therefrom into the atmosphere, and, in a majority of cases, possess a characteristic odor capable of masking the pungent odor of the formic aldehyde content.

The largest percentage of formic aldehyde contained under conditions in aqueous solutions, does not exceed forty percent, whereas oxy-acid esters have the property of transforming the gaseous formic aldehyde into a liquid condition with such avidity and permanency that solutions even up to eighty percent formic aldehyde have been produced without polymerization into solid products, and is discharged therefrom upon evaporation, as gaseous formic aldehyde, while at the same time the valuable disinfectant and germicide properties of the formic aldehyde have not been deteriorated but in fact seem to be enhanced by its union or composition with the volatile oxy-acid ester solvent or vehicle.

Volatile oxy-acid ester containing formic aldehyde in any desired percentage may be easily produced by calculating the amount of formic aldehyde evolved from the formic aldehyde-yielding ingredients associated with the solvent ester and discharging or generating the formic aldehyde from said ingredients in the presence of the solvent ester in proportion sufficient to produce a solution of the formic aldehyde evolved up to the calculated percentage. It is advisable, however, to produce a saturated solution of formic aldehyde in the solvent oxy-acid ester by thoroughly charging it and ascertaining by analysis the exact formic aldehyde content from which solution containing the predetermined percentage of formic aldehyde, solutions of varying strength may be produced by dilution with a similar oxy-acid ester or other diluent mixtures, compositions, or substances inert to the formic aldehyde content and the oxy-acid ester solvent therefor.

The term "formic aldehyde" employed throughout this specification and claims, is intended to include its polymerids or equivalents, such as paraformaldehyde or trioxymethylene and intermediate polymerization products, as well as formic aldehyde *per se*, and the term "oxy-acid ester" to what may be termed an alkyl salt or substitution product of an oxy-acid, *i. e.*, an acid containing oxygen, which esters may be either obtained from nature or artificially or synthetically prepared; and the term "containing oxy-acid ester", as employed in this specification and claims with reference to the vehicle for the formic aldehyde, refers to fluid oxy-acid esters *per se* or inert diluent containing the same in any desired proportion, the term "inert" implying a diluent compatible with formic aldehyde and the oxy-acid ester, without decomposition.

Having thus described my invention, what I claim as new and desire to secure by Letters Patent is:—

1. A new composition of matter comprising an acetic ester containing formic aldehyde.
2. A new composition of matter comprising methyl-acetic ester containing formic aldehyde.
3. A new fluid composition of matter consisting of formic aldehyde, an acetic ester, and a diluent.
4. A new composition of matter consisting of formic aldehyde, methyl-acetic ester, and a diluent.
5. A new composition of matter consisting of formic aldehyde, an acetic ester, and camphor oil.
6. A new composition of matter consisting of formic aldehyde, methyl-acetic ester, and camphor oil.
7. The process of making the new composition of matter herein set forth, which consists in displacing formic aldehyde from a solvent of the same in the presence of an acetic ester and exposing the same to intimate association until the formic aldehyde has become associated therewith or occluded therein.
8. The process of making the new composition of matter herein set forth, which consists in displacing formic aldehyde from a solvent of the same in the presence of methyl-acetic ester and exposing the same to intimate association until the formic aldehyde has become associated therewith or occluded therein.
9. The process of making a solution of formic aldehyde in methyl-acetic ester, which consists in mixing methyl-acetic ester with an aqueous solution of formic aldehyde and displacing the formic aldehyde from its aqueous solution in the presence of the methyl-acetic ester by adding thereto a substance an aqueous solution of which is a lesser solvent for formic aldehyde than water, whereby the said substance is dissolved, yielding formic aldehyde to the methyl-acetic ester which dissolves therein, and finally separating the solution of formic aldehyde in methyl-acetic ester from the associated fluids in which it is insoluble.

In testimony whereof I affix my signature in presence of two witnesses.

HENRY SPENCER BLACKMORE.

Witnesses:
H. N. JENKINS,
C. G. WRIGHT.